(12) United States Patent
Tomita et al.

(10) Patent No.: US 10,808,797 B2
(45) Date of Patent: Oct. 20, 2020

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventors: Yusuke Tomita, Neyagawa (JP); Tomohiro Wada, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/273,780

(22) Filed: Feb. 12, 2019

(65) Prior Publication Data

US 2019/0257385 A1 Aug. 22, 2019

(30) Foreign Application Priority Data

Feb. 21, 2018 (JP) ................. 2018-028510

(51) Int. Cl.
*F16F 15/14* (2006.01)
*F16F 15/134* (2006.01)
(Continued)

(52) U.S. Cl.
CPC ...... *F16F 15/145* (2013.01); *F16F 15/13407* (2013.01); *F16F 15/31* (2013.01);
(Continued)

(58) Field of Classification Search
CPC .... F16F 15/145; F16F 15/13407; F16F 15/31; F16F 15/315; F16F 2222/08; F16F 2230/0064
See application file for complete search history.

(56) References Cited

U.S. PATENT DOCUMENTS

2014/0251073 A1* 9/2014 Verhoog .............. F16F 15/145
74/572.21
2015/0075320 A1* 3/2015 Verhoog .............. F16F 15/145
74/574.2
(Continued)

FOREIGN PATENT DOCUMENTS

FR 3073591 A1 * 5/2019 ............ F16F 15/145
JP 2017-053467 A 3/2017
JP 2018-013153 A 1/2018

*Primary Examiner* — Vicky A Johnson
(74) *Attorney, Agent, or Firm* — United IP Counselors, LLC

(57) ABSTRACT

A torque fluctuation inhibiting device configured to inhibit torque fluctuations is disclosed. The torque fluctuation inhibiting device comprises a first rotor, a second rotor disposed to be rotatable relative to the first rotor, a centrifugal element, and a cam mechanism. The centrifugal element is configured to receive a centrifugal force generated by rotation of the first rotor. The centrifugal element is disposed to be movable with respect to the first rotor. The centrifugal element includes an engaging portion configured to be engage with the first rotor. The centrifugal element is formed by a plurality of components. The cam mechanism is configured to generate a circumferential force in movement of the centrifugal element and the circumferential force reduces relative displacement between the first rotor and the second rotor.

10 Claims, 12 Drawing Sheets

(51) Int. Cl.
*F16F 15/31* (2006.01)
*F16H 45/02* (2006.01)
*F16F 15/315* (2006.01)

(52) U.S. Cl.
CPC ........... *F16F 15/315* (2013.01); *F16H 45/02* (2013.01); *F16F 2222/08* (2013.01); *F16F 2230/0064* (2013.01)

(56) References Cited

U.S. PATENT DOCUMENTS

| | | | |
|---|---|---|---|
| 2017/0037930 A1* | 2/2017 | Cailleret | F16F 15/145 |
| 2019/0078644 A1* | 3/2019 | Tomiyama | F16F 15/14 |
| 2019/0085936 A1* | 3/2019 | Kawahara | F16F 15/145 |
| 2019/0186593 A1* | 6/2019 | Kawahara | F16F 15/1464 |
| 2019/0226553 A1* | 7/2019 | Tomita | F16F 15/145 |
| 2019/0257385 A1* | 8/2019 | Tomita | F16F 15/315 |

* cited by examiner

TORQUE FLUCTUATION INHIBITING DEVICE, TORQUE CONVERTER AND POWER TRANSMISSION DEVICE

CROSS-REFERENCE TO RELATED APPLICATIONS

This application claims priority to Japanese Patent Application No. 2018-028510, filed Feb. 21, 2018. The contents of that application are incorporated by reference herein in their entirety.

BACKGROUND

Technical Field

The present invention relates to a torque fluctuation inhibiting device, a torque converter and a power transmission device.

Background Art

For example, a clutch device, including a damper device, and a torque converter are provided between an engine and a transmission in an automobile. For reduction in fuel consumption, the torque converter is provided with a lock-up device for mechanically transmitting a torque at a predetermined rotational speed or greater.

Japan Laid-open Patent Application Publication No. 2017-53467 describes a lock-up device including a torque fluctuation inhibiting device. The torque fluctuation inhibiting device described in Japan Laid-open Patent Application Publication No. 2017-53467 includes an inertia ring, a plurality of centrifugal elements and a plurality of cam mechanisms. The inertia ring is rotatable relative to a hub flange to which a torque is transmitted, and a centrifugal force acts on each centrifugal element in rotation of the hub flange and the inertia ring. Each cam mechanism includes a cam provided on the surface of each centrifugal element and a cam follower making contact with the cam.

In the device described in Japan Laid-open Patent Application Publication No. 2017-53467, when the hub flange and the inertia ring are displaced in a rotational direction by torque fluctuations, each cam mechanism is actuated in response to the centrifugal force acting on each centrifugal element, and converts the centrifugal force acting on each centrifugal element into a circumferential force directed to reduce the displacement between the hub flange and the inertia ring. Torque fluctuations are inhibited by this circumferential force.

In the torque fluctuation inhibiting device described in Japan Laid-open Patent Application Publication No. 2017-53467, each centrifugal element is provided as a single member. For example, as shown in FIG. 11 of Japan Laid-open Patent Application Publication No. 2017-53467, when rollers are disposed in each centrifugal element, it is required to form groove portions (engaging portions) on each centrifugal element. However, it is difficult to form the groove portions on each centrifugal element provided as a single member such that each groove portion has a width suitably set in accordance with the thickness of each roller. Additionally, when each centrifugal element is formed as a single member by cutting or so forth, there are chances of increase in manufacturing cost of each centrifugal element.

BRIEF SUMMARY

The present invention is made in view of the aforementioned drawbacks, and it is an object of the present invention is to provide a torque fluctuation inhibiting device in which a centrifugal element can be easily configured. Besides, it is another object of the present invention to provide a torque fluctuation inhibiting device in which a centrifugal element can be reduced in manufacturing cost.

(1) A torque fluctuation inhibiting device according to an aspect of the present invention is a torque fluctuation inhibiting device inhibiting torque fluctuations. The torque fluctuation inhibiting device includes a first rotor, a second rotor, a centrifugal element and a cam mechanism. The second rotor is disposed to be rotatable relative to the first rotor. The centrifugal element receives a centrifugal force generated by rotation of the first rotor.

The centrifugal element is disposed to be movable with respect to the first rotor. The centrifugal element includes an engaging portion configured to be engage with the first rotor. The centrifugal element is formed by a plurality of components. The cam mechanism generates a circumferential force, reducing relative displacement between the first rotor and the second rotor, in movement of the centrifugal element.

In the present torque fluctuation inhibiting device, the centrifugal element is engaged with the first rotor through the engaging portion, and is disposed to be movable with respect to the first rotor by the centrifugal force. The centrifugal element, actuated as described above, is composed of the plurality of components. Hence, the engaging portion of the centrifugal element can be easily formed. In other words, the centrifugal element can be easily configured. Additionally, the centrifugal element can be reduced in manufacturing cost.

(2) In a torque fluctuation inhibiting device according to another aspect of the present invention, the cam mechanism is preferably formed by a cam follower portion and a cam portion. The cam follower portion is provided on the second rotor. The cam portion is provided on the centrifugal element, and is engaged with the cam follower portion. The plurality of components include a first component and a second component. The first component includes the engaging portion. The second component is provided separately from the first component. The second component includes at least part of the cam portion.

In this case, the first component, provided separately from the second component, includes the engaging portion. Hence, the centrifugal element can be easily configured. Additionally, the centrifugal element can be reduced in manufacturing cost.

(3) In a torque fluctuation inhibiting device according to yet another aspect of the present invention, the cam portion is preferably provided on the second component.

In this case, the engaging portion is provided on the first component, whereas the cam portion is provided on the second component. Accordingly, the centrifugal element can be easily configured. Additionally, the centrifugal element can be reduced in manufacturing cost.

(4) In a torque fluctuation inhibiting device according to yet another aspect of the present invention, the cam portion is preferably provided on the first component and the second component.

In this case, the engaging portion is provided on the first component, whereas the cam portion is provided on the first component and the second component. Accordingly, the centrifugal element can be easily configured. Additionally, the centrifugal element can be reduced in manufacturing cost.

(5) In a torque fluctuation inhibiting device according to yet another aspect of the present invention, the engaging portion preferably includes a first engaging portion and a second engaging portion disposed in opposition to the first engaging portion. The first engaging portion is provided on one of a pair of first components including the first component. The second engaging portion is provided on the other of the pair of first components.

With the configuration, the engaging portion of the centrifugal element can be easily formed. In other words, the centrifugal element can be easily configured. Additionally, the centrifugal element can be reduced in manufacturing cost.

(6) In a torque fluctuation inhibiting device according to yet another aspect of the present invention, the engaging portion preferably includes a first engaging portion and a second engaging portion disposed in opposition to the first engaging portion. The first engaging portion and the second engaging portion are provided on a pair of first components including the first component on a one-to-one basis.

With the configuration, the engaging portion of the centrifugal element can be easily formed. In other words, the centrifugal element can be easily configured. Additionally, the centrifugal element can be reduced in manufacturing cost.

(7) In a torque fluctuation inhibiting device according to yet another aspect of the present invention, the second component is disposed between a pair of first components including the first component.

With the configuration, the engaging portion of the centrifugal element can be easily formed. In other words, the centrifugal element can be easily configured. Additionally, the centrifugal element can be reduced in manufacturing cost. Moreover, it is not required to specially prepare a component used as a cam, and this enables reduction in number of components.

(8) In a torque fluctuation inhibiting device according to yet another aspect of the present invention, the cam mechanism is preferably formed by a cam follower portion and a cam portion. The cam follower portion is provided on the second rotor. The cam portion is provided on the centrifugal element, and is engaged with the cam follower portion.

The plurality of components include a third component and a fourth component provided separately from the third component. Each of the third and fourth components includes the engaging portion. One of the third and fourth components includes the cam portion.

With the configuration, the engaging portion of the centrifugal element can be easily formed. In other words, the centrifugal element can be easily configured. Additionally, the centrifugal element can be reduced in manufacturing cost.

(9) In a torque fluctuation inhibiting device according to yet another aspect of the present invention, the cam portion is preferably integrated with the one of the third and fourth components.

With the configuration, it is not required to specially prepare a component used as a cam, and this enables reduction in number of components.

(10) In a torque fluctuation inhibiting device according to yet another aspect of the present invention, the engaging portion preferably includes a third engaging portion and a fourth engaging portion. The fourth engaging portion is disposed in opposition to the third engaging portion. The third engaging portion is provided on one of the third and fourth components. The fourth engaging portion is provided on the other of the third and fourth components.

With the configuration, the engaging portion of the centrifugal element can be easily formed. In other words, the centrifugal element can be easily configured. Additionally, the centrifugal element can be reduced in manufacturing cost.

(11) A torque converter according to an aspect of the present invention is a torque converter disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device recited in any one of the configurations (1) to (10). Even with the configuration, it is possible to achieve advantageous effects similar to those described above.

(12) A power transmission device according to as aspect of the present invention includes a flywheel, a clutch device and the torque fluctuation inhibiting device recited in any of the configurations (1) to (10). The flywheel includes a first inertia body, a second inertia body and a damper. The first inertia body is rotated about a rotational axis. The second inertia body is rotated about the rotational axis and is rotatable relative to the first inertia body. The damper is disposed between the first inertia body and the second inertia body. The clutch device is provided between the second inertia body of the flywheel and a transmission. Even with the configuration, it is possible to achieve advantageous effects similar to those described above.

Overall, according to the present invention, in the torque fluctuation inhibiting device, the centrifugal element can be easily configured. Additionally, in the torque fluctuation inhibiting device, the centrifugal element can be reduced in manufacturing cost.

DETAILED DESCRIPTION OF THE EMBODIMENTS

First Preferred Embodiment

Figure 1:
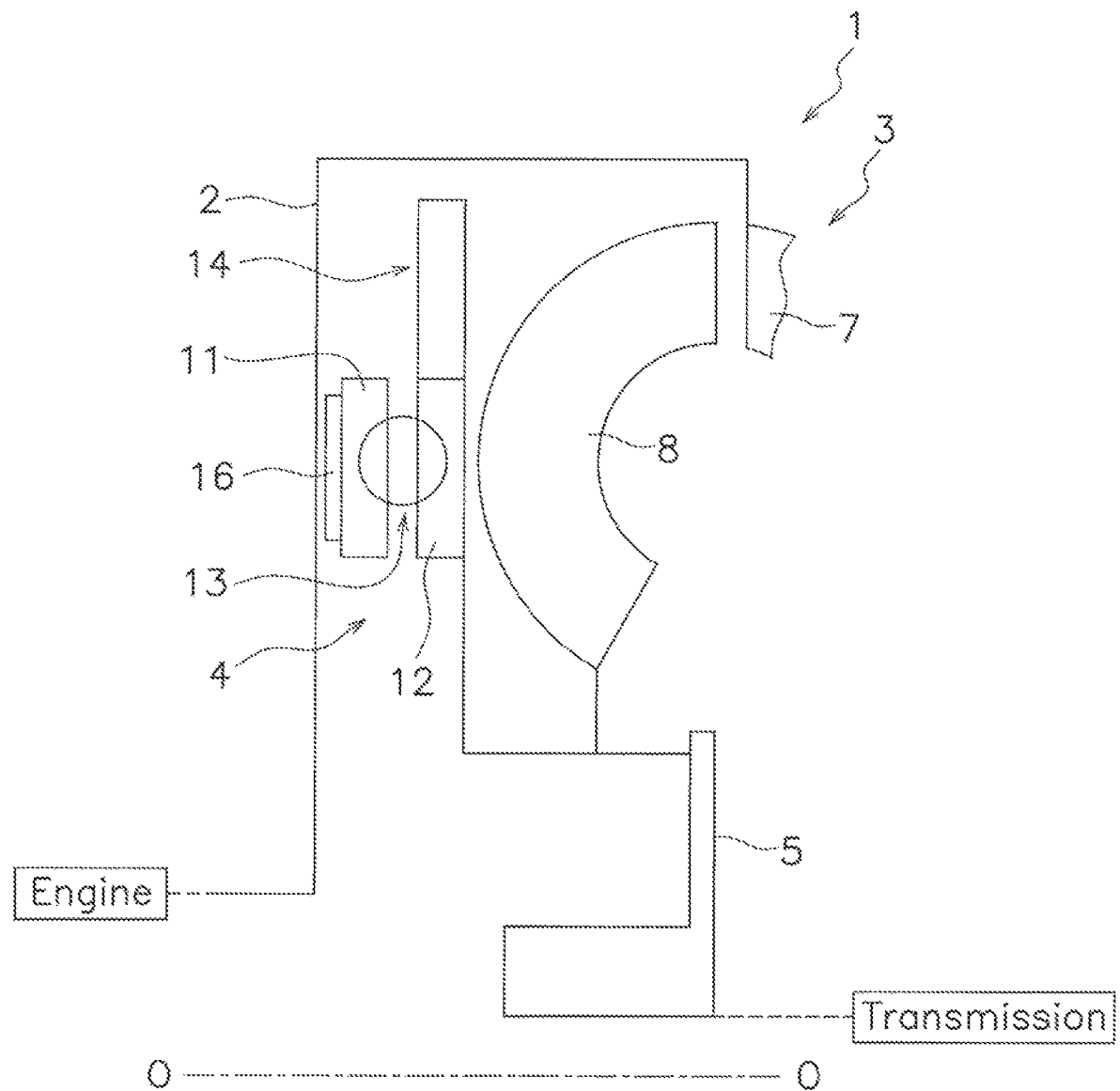
FIG. 1 is a schematic diagram of a torque converter according to a first preferred embodiment of the present invention.

FIG. 1 is a schematic diagram in a condition that a torque fluctuation inhibiting device 14 according to a first preferred embodiment of the present invention is attached to a lock-up device 4 of a torque converter 1. In FIG. 1, line O-O indicates a rotational axis of the torque converter 1.

[Entire Configuration]

The torque converter 1 includes a front cover 2, a torque converter body 3, the lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5. An input shaft of a transmission (not shown in the drawings) is spline-coupled to the inner peripheral part of the output hub 5.

[Lock-Up Device]

The lock-up device 4 includes a clutch part, a piston to be actuated by hydraulic pressure, and so forth, and is settable to a lock-up on state and a lock-up off state.

In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, a hub flange 12, a damper 13 and the torque fluctuation inhibiting device 14.

The input-side rotor 11 includes an axially movable piston, and is provided with a friction member 16 fixed to the front cover 2-side lateral surface thereof. When the friction member 16 is pressed onto the front cover 2, the torque is transmitted from the front cover 2 to the input-side rotor 11.

The hub flange 12 is disposed in axial opposition to the input-side rotor 11, and is rotatable relative to the input-side rotor 11. The hub flange 12 is coupled to the output hub 5. The hub flange 12 is also a member composing part of the torque fluctuation inhibiting device 14.

The damper 13 is disposed between the input-side rotor 11 and the hub flange 12. The damper 13 includes a plurality of torsion springs, and elastically couples the input-side rotor 11 and the hub flange 12 in a rotational direction. The damper 13 transmits the torque from the input-side rotor 11 to the hub flange 12, and also, absorbs and attenuates torque fluctuations.

[Torque Fluctuation Inhibiting Device]

Figure 2:
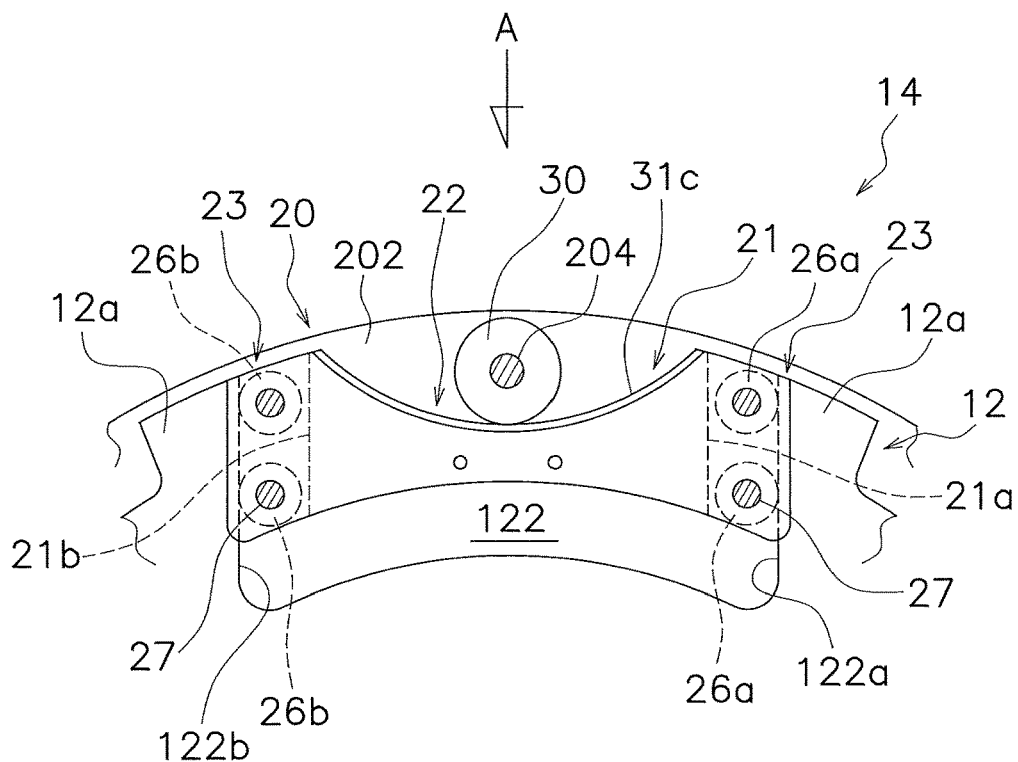
FIG. 2 is a partial front view of a hub flange and a torque fluctuation inhibiting device that are shown in FIG. 1.
Figure 3:
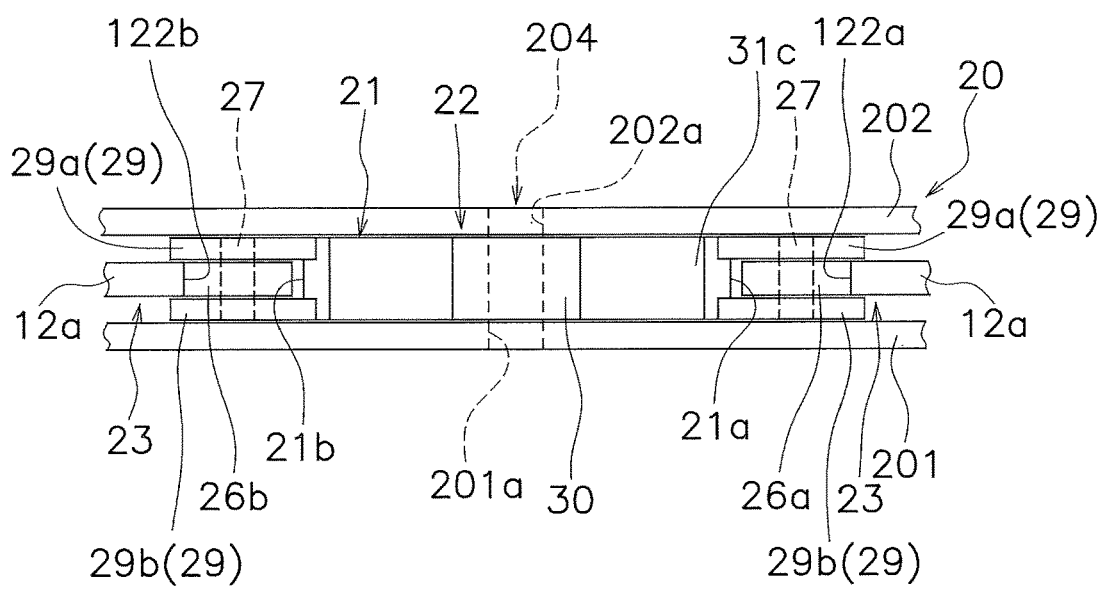
FIG. 3 is a view of FIG. 2 as seen from arrow A.
Figure 4:
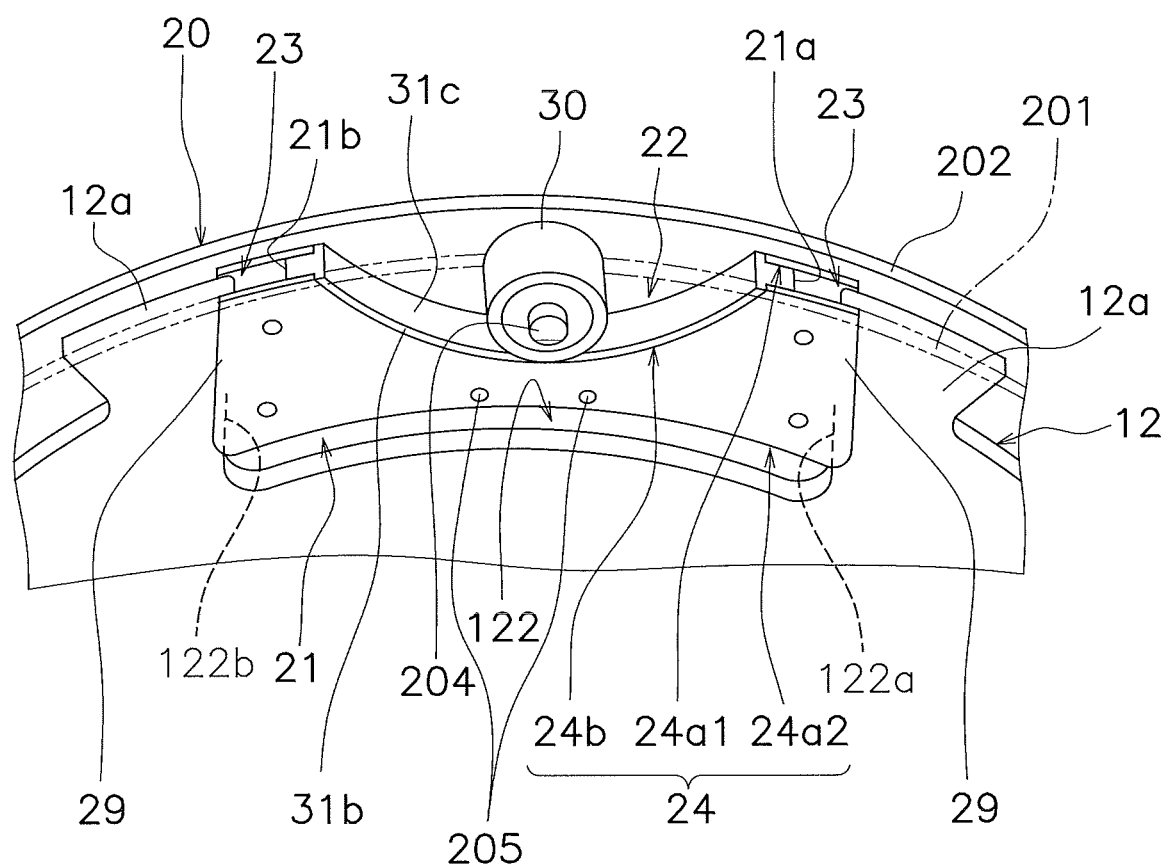
FIG. 4 is a perspective view of the part shown in FIG. 2.

FIG. 2 is a front view of the hub flange 12 and the torque fluctuation inhibiting device 14. It should be noted that FIG. 2 shows a condition that one of inertia rings (near-side inertia ring) is detached. FIG. 3 is a view of FIG. 2 as seen from direction A, whereas FIG. 4 is an external perspective view of FIG. 2. In the present preferred embodiment, the torque fluctuation inhibiting device 14 is provided in four positions at equal intervals in a circumferential direction.

As shown in FIG. 2, the torque fluctuation inhibiting device 14 is a device that inhibits torque fluctuations. The torque fluctuation inhibiting device 14 includes the aforementioned hub flange 12 (exemplary first rotor), an inertia ring 20 (exemplary second rotor), centrifugal elements 21 and cam mechanisms 22.

Detailedly, the torque fluctuation inhibiting device 14 includes the hub flange 12 including support portions 23, first and second inertia rings 201 and 202, which compose the inertia ring 20 as a mass body, four centrifugal elements 21 and four cam mechanisms 22.

(Hub Flange)

As shown in FIG. 2, the hub flange 12 has a disc shape, and as described above, is coupled at the inner peripheral part thereof to the output hub 5. The hub flange 12 is provided with four protruding portions 12a on the outer peripheral part thereof. Each protruding portion 12a protrudes from the outer peripheral part to the further outer peripheral side, and has a predetermined width in the circumferential direction. Each protruding portion 12a is provided with a recessed portion 122 having a predetermined width, as an accommodation portion, in the circumferentially middle part thereof. The recessed portion 122 is opened radially outward and has a predetermined depth.

The hub flange 12 includes the support portions 23. Each support portion 23 is provided in each recessed portion 122. Each support portion 23 supports each centrifugal element 21 such that each centrifugal element 21 is movable. Detailedly, each support portion 23 supports each centrifugal element 21 such that each centrifugal element 21 is movable in a radial direction. Each support portion 23 will be described below in detail.

(First and Second Inertia Rings)

The inertia ring 20 (e.g., the first and second inertia rings 201 and 202) is disposed to be rotatable relative to the hub flange 12.

Each of the first and second inertia rings 201 and 202 is a continuous annular plate having a predetermined thickness. As shown in FIG. 3, the first and second inertia rings 201 and 202 are disposed axially on the both sides of the hub flange 12 such that a predetermined gap is produced between the hub flange 12 and each inertia ring 201, 202.

In other words, the hub flange 12 and the first and second inertia rings 201 and 202 are disposed in axial alignment. The first and second inertia rings 201 and 202 have a common rotational axis that is the same as the rotational axis of the hub flange 12.

The first and second inertia rings 201 and 202 are fixed to each other by at least one fixation member (e.g., rivet) not shown in the drawings. Accordingly, the first inertia ring 201 is axially, radially and rotation-directionally immovable with respect to the second inertia ring 202. Additionally, the first and second inertia rings 201 and 202 are rotatable relative to the hub flange 12.

As shown in FIGS. 2 and 3, each of the first and second inertia rings 201 and 202 is provided with holes 201a, 202a, each of which axially penetrates therethrough. Additionally, shaft portions 204 are disposed in pairs of holes 201a and 202a, respectively. Rollers 30 are disposed on the outer peripheral parts of the shaft portions 204, respectively. Each roller 30 is rotatable about each shaft portion 204.

(Centrifugal Elements and Support Portions)

Each centrifugal element 21 receives a centrifugal force generated in rotation of the hub flange 12. Each centrifugal element 21 is disposed to be movable with respect to the hub flange 12.

Detailedly, as shown in FIG. 2, each centrifugal element 21 is disposed in each recessed portion 122 of the hub flange 12, and is radially movable by the centrifugal force generated in rotation of the hub flange 12.

As shown in FIGS. 2 and 3, each centrifugal element 21 has a shape elongated in one direction. As shown in FIG. 3, each centrifugal element 21 is provided with grooves 21a and 21b on the both ends thereof. The width of each groove 21a, 21b is greater than the thickness of the hub flange 12. The hub flange 12 (e.g., each support portion 23) is disposed inside the grooves 21a and 21b.

As shown in FIGS. 2 and 3, a first guide roller 26a and a second guide roller 26b are attached to each centrifugal element 21 through pins 27. The first and second guide rollers 26a and 26b are rotatably supported by the pins 27. The pins 27 are inserted through the first and second guide rollers 26a and 26b. The both ends of each pin 27 is fixed to each centrifugal element 21 (a pair of first components 24a1 and 24a2 to be described).

The first and second guide rollers 26a and 26b are disposed in the grooves 21a and 21b provided on the both ends of each centrifugal element 21, respectively. Each of the both guide rollers 26a and 26b is composed of an outer peripheral side rolling element and an inner peripheral side rolling element disposed on the inner peripheral side of the outer peripheral side rolling element.

The first guide roller 26a is configured to roll in contact with a first sidewall 122a of each recessed portion 122. The second guide roller 26b is configured to roll in contact with a second sidewall 122b located on the opposite side of the first sidewall 122a in each recessed portion 122. In other words, the first and second side walls 122a and 122b of each recessed portion 122 function as each support portion 23 by which each centrifugal element 21 is supported to be radially movable.

Figure 5:
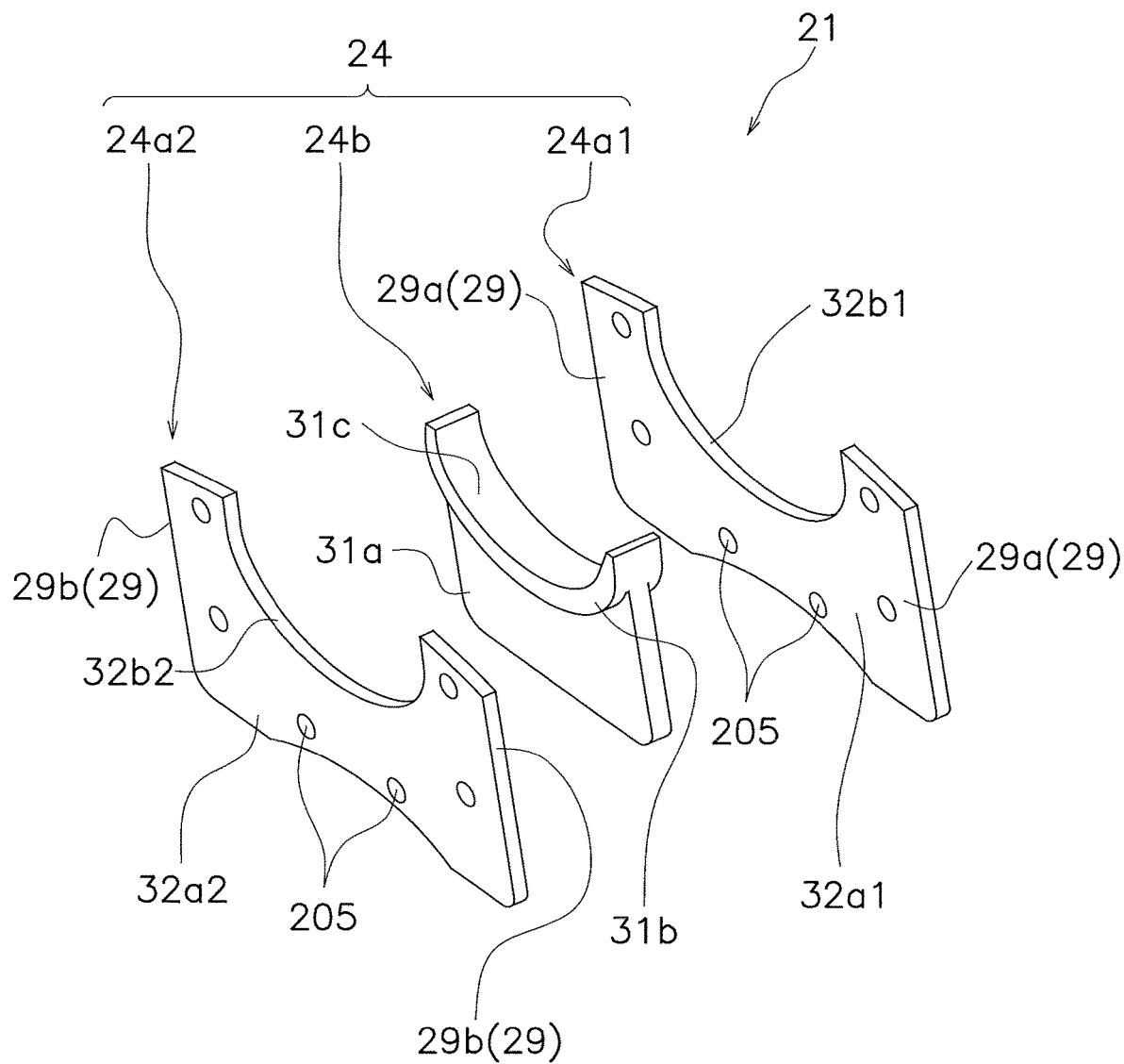
FIG. 5 is an exploded perspective view of each centrifugal element.

As shown in FIGS. 4 and 5, each centrifugal element 21 is composed of a plurality of components 24. In the present preferred embodiment, the plural components 24 include the pair of first components 24a1 and 24a2 and a second component 24b.

As shown in FIG. 5, each of the pair of first components 24a1 and 24a2 includes a body 32a1, 32a2 and a cam receiving surface 32b1, 32b2.

Each body 32a1, 32a2 is made in the shape of a plate elongated in one direction. Each cam receiving surface 32b1, 32b2 is provided on the radially outer region of the outer peripheral surface of each body 32a1, 32a2. Each cam receiving surface 32b1, 32b2 is made in the shape of a circular arc recessed radially inward. A cam provided portion 31b (to be described) is disposed on the cam receiving surfaces 32b1 and 32b2.

As shown in FIGS. 4 and 5, each of the pair of first components 24a1 and 24a2 further includes an engaging portion 29. The engaging portions 29 are configured to be engaged with the hub flange 12, for instance, each support portion 23.

As shown in FIG. 5, the engaging portion 29 of the first component 24a1 includes a pair of first engaging portions 29a. The pair of first engaging portions 29a is provided on the both ends of the body 32a1, respectively.

The engaging portion 29 of the first component 24a2 includes a pair of second engaging portions 29b. The pair of second engaging portions 29b is provided on the both ends of the body 32a2, respectively. The second engaging portions 29b are disposed in opposition to the first engaging portions 29a (see FIG. 3).

One of the pair of first engaging portions 29a and one of the pair of second engaging portions 29b form a wall portion of the groove 21a. The first guide roller 26a is disposed axially between these first and second engaging portions 29a and 29b. Additionally, the hub flange 12, for instance, each support portion 23 (the first side wall 122a) is disposed axially between the distal ends of these first and second engaging portions 29a and 29b.

The other of the pair of first engaging portions 29a and the other of the pair of second engaging portions 29b form a wall portion of the groove 21b. The second guide roller 26b is disposed axially between these first and second engaging portions 29a and 29b. Additionally, the hub flange 12, for instance, each support portion 23 (the second sidewall 122b) is disposed axially between the distal ends of these first and second engaging portions 29a and 29b.

As shown in FIGS. 4 and 5, the second component 24b is provided separately from the pair of first components 24a1 and 24a2. The second component 24b is disposed between the pair of first components 24a1 and 24a2. The second component 24b is herein disposed axially between the pair of first components 24a1 and 24a2. The second component 24b includes at least part of a cam surface 31c (exemplary cam portion).

Specifically, the second component 24b includes a body 31a and the cam provided portion 31b. The body 31a is made in the shape of a plate elongated in one direction. The body 31a is disposed axially between the pair of first components 24a1 and 24a2.

The cam provided portion 31b is provided on the outer peripheral part of the body 31a. For example, the cam provided portion 31b is provided on radially outer region of the outer peripheral part of the body 31a. The cam provided portion 31b is made in the shape of a circular arc recessed radially inward. The cam provided portion 31b is disposed on the cam receiving surfaces 32b1 and 32b2 (see FIG. 4).

The cam provided portion 31b includes the cam surface 31c. The cam surface 31c is made in the shape of a circular arc recessed to the inner peripheral side. While the cam provided portion 31b is disposed on the cam receiving surfaces 32b1 and 32b2, the cam surface 31c is disposed radially outside the cam receiving surfaces 32b1 and 32b2. The cam surface 31c functions as a cam of each cam mechanism 22.

In each centrifugal element 21 configured as described above, each of the pair of first components 24a1 and 24a2 is fixed to the second component 24b through at least one hole 205 by fixation means, for instance, welding or so forth. Here, each of the pair of first components 24a1 and 24a2 (the body 32a1, 32a2) is provided with a plurality of (e.g., two) holes 205. The plural holes 205 penetrate each of the pair of first components 24a1 and 24a2 in the axial direction.

(Cam Mechanisms)

In movement of each centrifugal element 21, each cam mechanism 22 generates a circumferential force by which relative displacement between the hub flange 12 and the inertia ring 20 is reduced. As shown in FIGS. 2 and 4, each cam mechanism 22 is composed of the roller 30 (exemplary cam follower portion), which is provided on the inertia ring 20, and the cam surface 31c that is engaged with the roller 30. As described above, the cam surface 31c is provided on the second component 24b.

Each roller 30 has a cylindrical shape. Each roller 30 functions as a cam follower. Each cam surface 31c is provided on each centrifugal element 21. Each roller 30 is disposed on the outer peripheral part of each shaft portion 204 in a rotatable manner. Detailedly, each roller 30 is supported by the trunk of each shaft portion 204 in a rotatable manner. It should be noted that each roller 30 is preferably attached to the trunk of each shaft portion 204 in a rotatable manner, but alternatively, can be attached thereto in a non-rotatable manner.

Figure 6A:
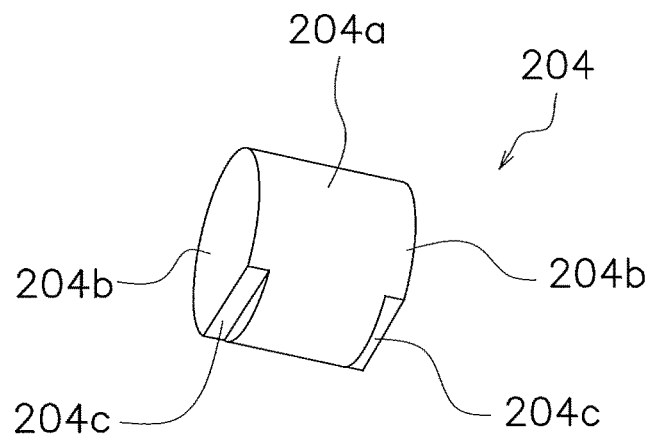
FIGS. 6A, 6B and 6C include a perspective view, a partially enlarged cross-sectional view and a partially enlarged front view of each shaft portion supporting each roller.

As shown in FIG. 6A, each shaft portion 204 herein includes a trunk 204a and a pair of attachment ends 204b. The trunk 204a is provided between the pair of attachment ends 204b. The trunk 204a has a columnar shape. Here, the trunk 204a is exemplified as having a columnar shape, but alternatively, can have a cylindrical shape.

Figures 6B, 6C:
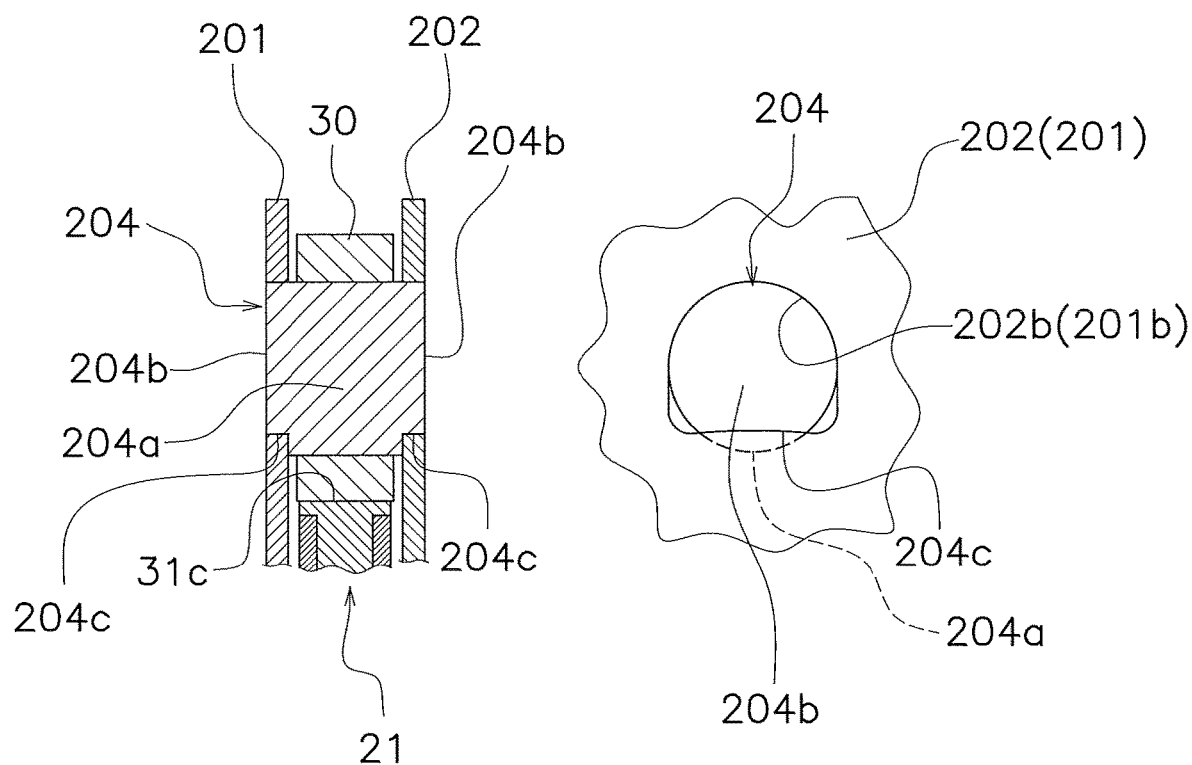

As shown of FIG. 6B, the pair of attachment ends 204b is attached to the inertia ring 20, for instance, the first and second inertia rings 201 and 202, respectively. Each of the pair of attachment ends 204b has a non-circular shape.

Detailedly, each of the pair of attachment ends 204b is provided with a cutout 204c, and therefore, has a non-circular shape. It should be noted that each of the pair of attachment ends 204b is herein exemplified as being provided with the cutout 204c, but alternatively, only one of the pair of attachment ends 204b can be provided with the cutout 204c.

Each of the pair of attachment ends 204b is disposed in each of holes 201b and 202b non-circularly provided in each of the first and second inertia rings 201 and 202. Accordingly, each shaft portion 204 is restricted from rotating with respect to each of the first and second inertia rings 201 and 202.

As shown in FIGS. 4 and 5, the cam surface 31c is provided on the cam provided portion 31b as described above. The cam surface 31c is a circular-arc surface with which each roller 30 makes contact. Each roller 30 is moved along the cam surface 31c when the hub flange 12 and the first and second inertia rings 201 and 202 are rotated relative to each other in a predetermined angular range.

Although described below in detail, when rotational phase difference is produced between the hub flange 12 and the first and second inertia rings 201 and 202 by the contact between each roller 30 and the cam surface 31c, a centrifugal force generated in each centrifugal element 21 is converted into a circumferential force by which the rotational phase difference is reduced. Here, the relative displacement between the hub flange 12 and the inertia ring 20 in the rotational direction is referred to as "rotational phase difference".

[Actuation of Cam Mechanisms]

Actuation of each cam mechanism 22 (inhibition of torque fluctuations) will be explained with FIGS. 2 and 7. It should be noted that in the following explanation, the pair of first and second inertia rings 201 and 202 will be simply referred to as "an inertia ring 20" on an as-needed basis.

In the lock-up on state, a torque transmitted to the front cover 2 is transmitted to the hub flange 12 through the input-side rotor 11 and the damper 13. When torque fluctuations do not exist in torque transmission, the hub flange 12 and the inertia ring 20 are rotated in the condition shown in FIG. 2. In this condition, the roller 30 in each cam mechanism 22 is contacted to the most inner peripheral position (circumferential middle position) of the cam surface 31c, and the rotational phase difference between the hub flange 12 and the inertia ring 20 is "0".

As described above, the rotation-directional relative displacement between the hub flange 12 and the inertia ring 20 is referred to as "rotational phase difference". In FIGS. 2 and 7, these terms indicate displacement between the circumferential middle position of each centrifugal element 21 and each cam surface 31c and the center position of each roller 30.

Figure 7:
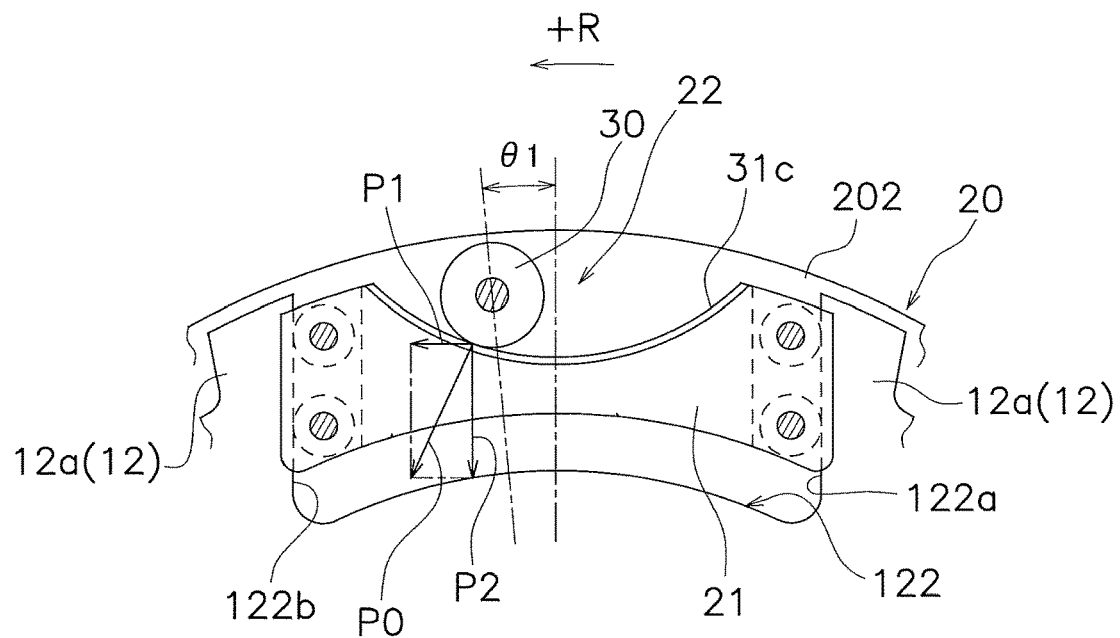
FIG. 7 is a diagram for explaining actuation of each cam mechanism.

When torque fluctuations herein exist in torque transmission, rotational phase difference θ is produced between the hub flange 12 and the inertia ring 20 as shown in FIG. 7. FIG. 7 shows a condition that rotational phase difference +θ1 is produced to a +R side.

As shown in FIG. 7, when the rotational phase difference +θ1 is produced between the hub flange 12 and the inertia ring 20, the roller 30 in each cam mechanism 22 is relatively moved along the cam surface 31c to the left side in FIG. 7. At this time, a centrifugal force acts on each centrifugal element 21. Hence, a reaction force to be received by the cam surface 31c provided on each centrifugal element 21 from the roller 30 has a direction and a magnitude indicated by P0 in FIG. 7. A first force component P1 and a second force component P2 are produced by the reaction force P0. The first force component P1 is directed in the circumferential direction, whereas the second force component P2 is directed to move each centrifugal element 21 to the inner peripheral side.

Additionally, the first force component P1 acts as a force to move the hub flange 12 leftward in FIG. 7 through each cam mechanism 22 and each centrifugal element 21. In other words, a force directed to reduce the rotational phase difference between the hub flange 12 and the inertia ring 20 is supposed to act on the hub flange 12. On the other hand, the second force component P2 moves each centrifugal element 21 to the inner peripheral side against the centrifugal force.

It should be noted that when the rotational phase difference is reversely produced, the roller 30 is relatively moved along the cam surface 31c to the right side in FIG. 7. However, the aforementioned actuation principle is also true of this case.

As described above, when the rotational phase difference is produced between the hub flange 12 and the inertia ring 20 by torque fluctuations, the hub flange 12 receives a force (first force component P1) directed to reduce the rotational phase difference between the both by the centrifugal force acting on each centrifugal element 21 and the working of each cam mechanism 22. Torque fluctuations are inhibited by this force.

The aforementioned force inhibiting torque fluctuations varies in accordance with the centrifugal force, in other words, the rotational speed of the hub flange 12, and also varies in accordance with the rotational phase difference and the shape of each cam surface 31c. Therefore, by suitably setting the shape of each cam surface 31c, characteristics of the torque fluctuation inhibiting device 14 can be made optimal in accordance with the specification of the engine and so forth.

For example, each cam surface 31c can be made in a shape that makes the first force component P1 linearly vary in accordance with the rotational phase difference in a condition where the centrifugal force acting is constant. Alternatively, each cam surface 31c can be made in a shape that makes the first force component P1 non-linearly vary in accordance with the rotational phase difference.

[Exemplary Characteristics]

Figure 8:
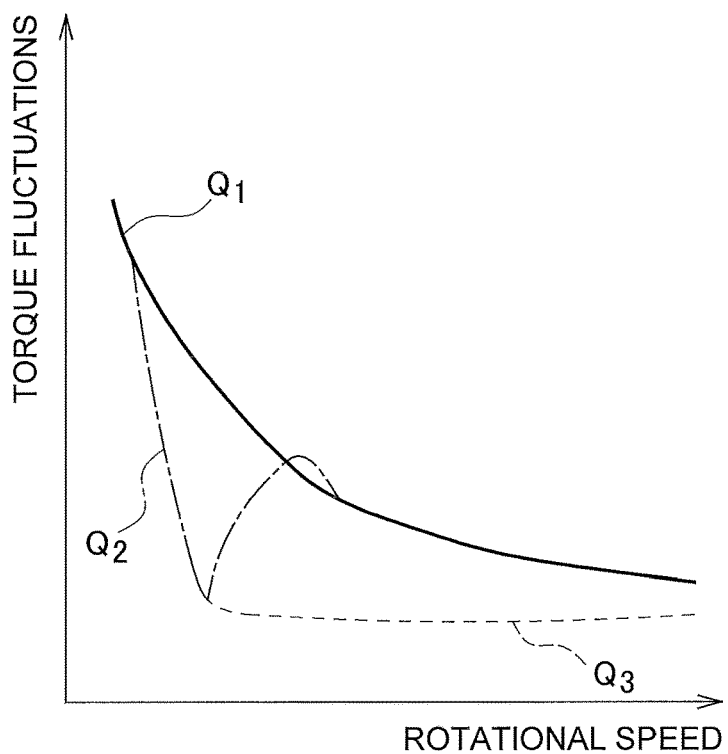
FIG. 8 is a characteristic diagram showing a relation between rotational speed and torque fluctuations.

FIG. 8 is a diagram showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 14 of the present preferred embodiment.

As is obvious from FIG. 8, in an apparatus in which the well-known dynamic damper device without any cam mechanism is installed (characteristic Q2), torque fluctuations can be inhibited only in a specific rotational speed range. By contrast, in the condition with installation of the cam mechanisms 22 of the present preferred embodiment (characteristic Q3), torque fluctuations can be inhibited through the entire rotational speed ranges.

First Modification

Figure 9:
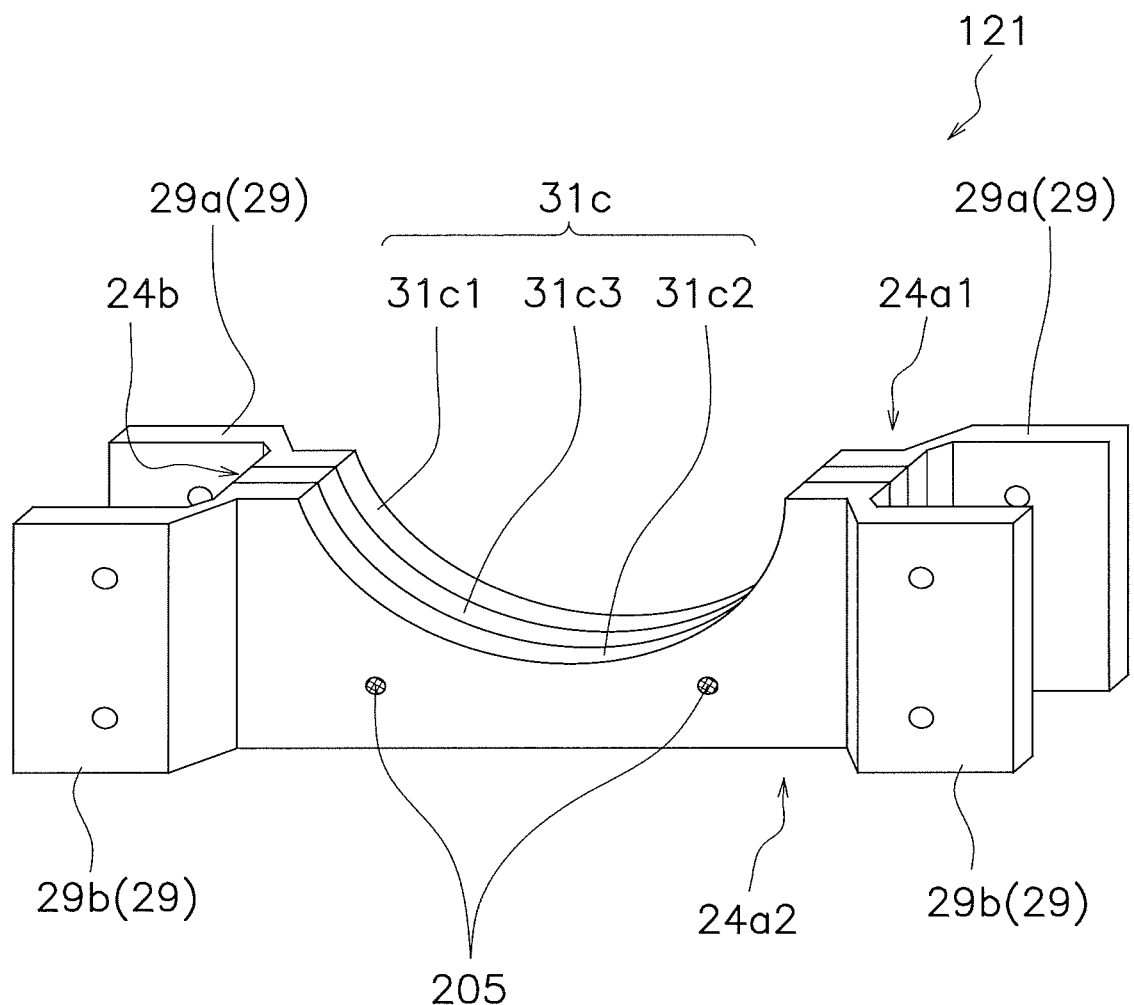
FIG. 9 is a perspective view of each centrifugal element for explaining a first modification in the first preferred embodiment of the present invention.

The first preferred embodiment has exemplified the configuration of each centrifugal element 21 in which the second component 24b includes the cam surface 31c. Instead of this, each centrifugal element can be configured as each centrifugal element 121 shown in FIG. 9.

In this case, in each centrifugal element 121, the pair of first components 24a1 and 24a2 and the second component 24b form the cam surface 31c. The cam surface 31c includes the cam surfaces 31c1, 31c2 and 31c3.

For example, the cam surfaces 31c1 and 31c2 are provided on the pair of first components 24a1 and 24a2, respectively. The cam surface 31c3 is provided on the second component 24b. In other words, the cam surface 31c (e.g., the cam surfaces 31c1, 31c2 and 31c3) functions as a cam of each cam mechanism 22 described above.

In this case, after the pair of first components 24a1 and 24a2 and the second component 24b are fixed to each other, the cam surfaces 31c1, 31c2 and 31c3 can be formed, and the pair of first engaging portions 29a and the pair of second engaging portions 29b can be formed. Accordingly, each centrifugal element 121 can be easily formed. Even when each centrifugal element is configured as each centrifugal element 121 described above, each centrifugal element can be actuated similarly to that in the first preferred embodiment.

Second Modification

Figure 10:
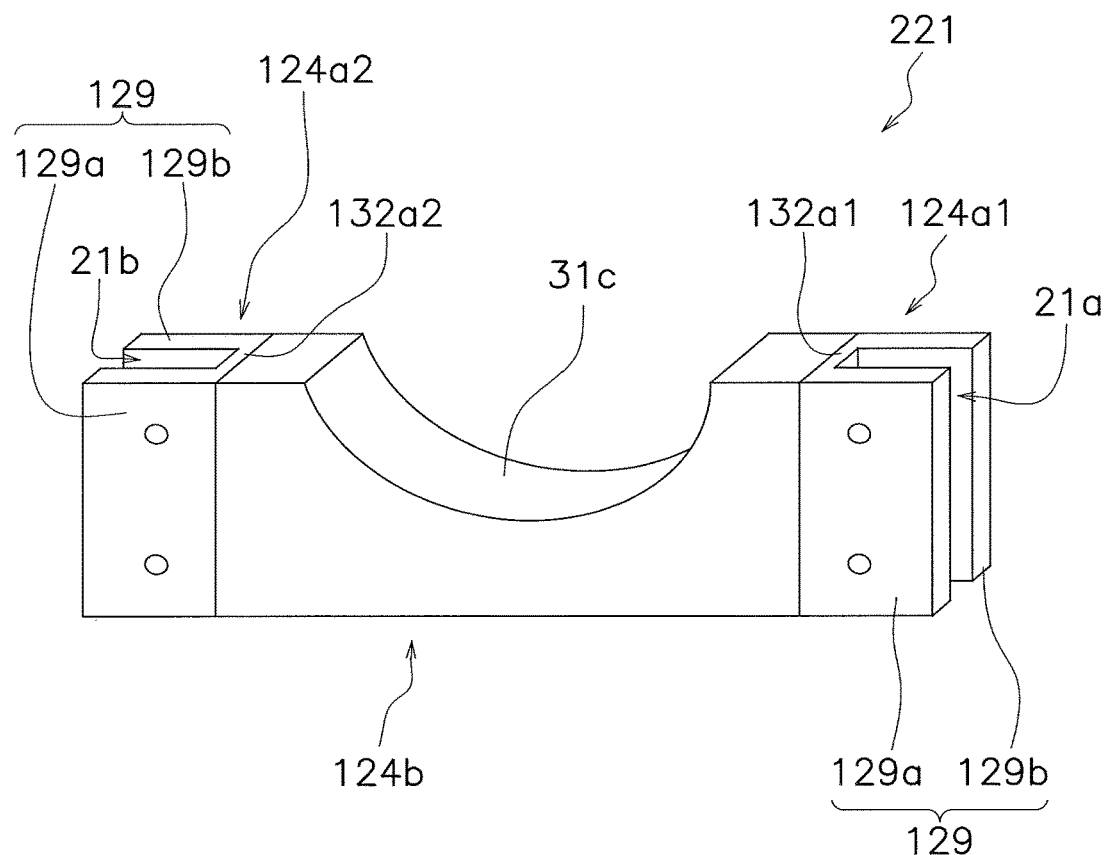
FIG. 10 is a perspective view of each centrifugal element for explaining a second modification in the first preferred embodiment of the present invention.

The first preferred embodiment has exemplified the configuration of each centrifugal element 21 in which the second component 24b is disposed axially between the pair of first components 24a1 and 24a2. Instead of this, each centrifugal element can be configured as each centrifugal element 221 shown in FIG. 10.

In this case, in each centrifugal element 221, a second component 124b, provided with the cam surface 31c, is disposed circumferentially between a pair of first components 124a1 and 124a2. The pair of first components 124a1 and 124a2 is fixed to the both ends of the second component 124b, respectively.

Each of the pair of first components 124a1 and 124a2 forms the groove 21a, 21b. Each of the pair of first components 124a1 and 124a2 includes a fixation portion 132a1, 132a2 and an engaging portion 129. The fixation portions 132a1 and 132a2 are fixed to the both ends of the second component 124b, respectively, by fixation means such as welding.

Each engaging portion 129 includes a first engaging portion 129a and a second engaging portion 129b disposed in opposition to the first engaging portion 129a. In the first component 124a1, the first and second engaging portions 129a and 129b protrude from the fixation portion 132a1. Likewise in the first component 124a2, the first and second engaging portions 129a and 129b protrude from the fixation portion 132a2, Similarly to the first preferred embodiment, in the first component 124a1, the first guide roller 26a is disposed axially between the first and second engaging portions 129a and 129b. Similarly to the first preferred embodiment, in the first component 124a2, the second guide roller 26b is disposed axially between the first and second engaging portions 129a and 129b. Even when each centrifugal element is configured as each centrifugal element 221 described above, each centrifugal element can be actuated similarly to that in the first preferred embodiment.

Second Preferred Embodiment

Except for centrifugal elements 321, constituent elements of a second preferred embodiment are substantially the same as those of the first preferred embodiment. Hence, in the second preferred embodiment, constituent elements, which are the same as those of the first preferred embodiment, will not be hereinafter explained. Explanation herein omitted conforms to that of the first preferred embodiment.

The first preferred embodiment has exemplified the configuration of each centrifugal element 21 composed of three components 24 including the pair of first components 24a1 and 24a2 and the second component 24b.

Figure 11:
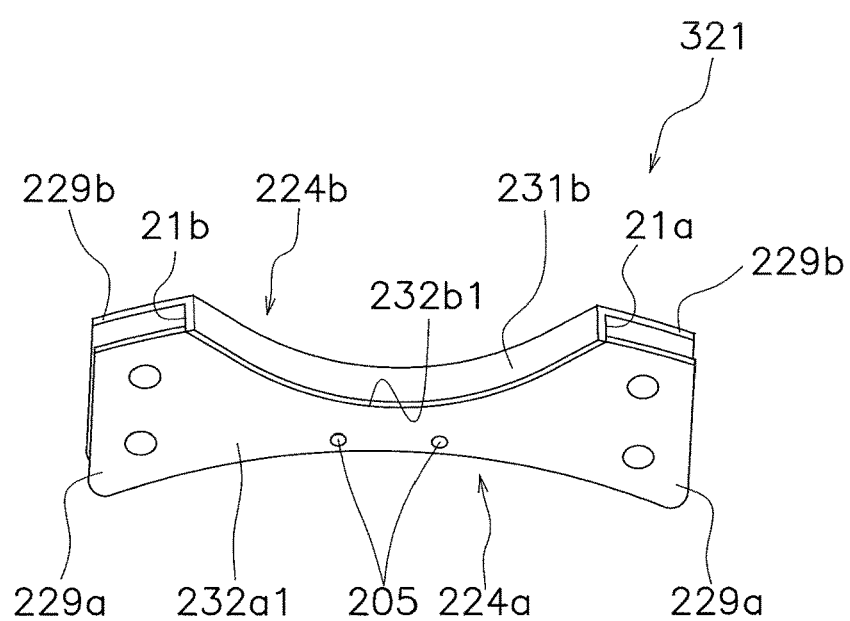
FIG. 11 is a perspective view of each centrifugal element for explaining a second preferred embodiment of the present invention.
Figure 12:
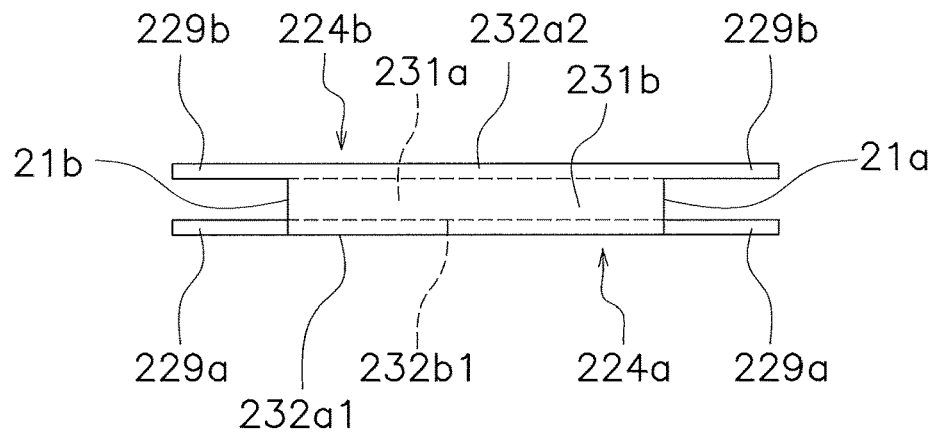
FIG. 12 is a top view of each centrifugal element for explaining the second preferred embodiment of the present invention.

In the second preferred embodiment, as shown in FIGS. 11 and 12, each centrifugal element 321 includes a third component 224a and a fourth component 224b provided separately from the third component 224a. In other words, each centrifugal element 321 is composed of the plural components 24, for instance, two components 224a and 224b.

The third component 224a includes a body 232a1, a pair of first engaging portions 229a and a cam receiving surface 232b1. The configuration of the third component 224a is substantially the same as that of each first component 24a1, 24a2 in the first preferred embodiment. Therefore, explanation of the third component 224a will be herein omitted.

The fourth component 224b includes a body 232a2, a pair of second engaging portions 229b and a protruding portion 231a. The body 232a2 is made in the shape of a plate elongated in one direction. The pair of second engaging portions 229b is provided on the both ends of the body 232a2, respectively. The second engaging portions 229b are disposed in opposition to the first engaging portions 229a.

The body 232a2 is provided with the protruding portion 231a between the pair of second engaging portions 229b. The protruding portion 231a is herein integrated with the body 232a2. The protruding portion 231a protrudes from the body 232a2 toward the third component 224a (the body 232a1). The protruding portion 231a is fixed to the third component 224a (the body 232a1) by fixation means such as welding.

The fourth component 224b further includes a cam surface 231b (exemplary cam portion). The cam surface 231b is provided on the radially outer side of the outer peripheral part of both the body 232a2 and the protruding portion 231a. The cam surface 231b is made in the shape of a circular arc recessed radially inward.

Thus, in the second preferred embodiment, each centrifugal element 321 is composed of two components including the third component 224a and the fourth component 224b. Even when each centrifugal element is configured as each centrifugal element 321 described above, each centrifugal element can be actuated similarly to that in the first preferred embodiment.

Other Preferred Embodiments

The present invention is not limited to the preferred embodiments described above, and a variety of changes or modifications can be made without departing from the scope of the present invention.

(1) The aforementioned preferred embodiments have exemplified the configurations of the centrifugal elements 21, 121, 221 and 321 in each of which plural members are joined to each other by fixation means such as welding. Instead of this, each centrifugal element 21, 121, 221, 321 can have a configuration that the plural members are joined to each other by fixation means such as at least one rivet.

(2) The aforementioned preferred embodiments have exemplified the configuration of each guide roller composed of the outer peripheral side rolling element and the inner peripheral side rolling element. However, each guide roller can be composed of only one rolling element.

(3) In the aforementioned preferred embodiments, the guide rollers are disposed in the grooves 21a and 21b, respectively. However, other members for reducing friction, each taking the form of a resin race, a seat or so forth, can be disposed instead. In this case, the members for reducing friction are preferably pressed onto each recess 122 of the hub flange 12 by urging members.

(4) So-called roller bearings can be used as the guide rollers in the aforementioned preferred embodiment. In this case, friction can be further reduced between each roller bearing and each support portion 23.

(5) In the aforementioned preferred embodiment, the recessed portions 122, opened to the outer peripheral side, are provided as the accommodation portions for accommodating the centrifugal elements 21, 121, 221, 321. However, the shape and so forth of each accommodation portion are not particularly limited as long as each accommodation portion is shaped to accommodate each centrifugal element 21, 121, 221, 321 so as to make each centrifugal element 21, 121, 221, 321 radially movable. For example, each accommodation portion can be an opening closed at an outer peripheral end thereof.

Application Examples

The torque fluctuation inhibiting device 14 described above can be disposed in a variety of settings when applied to the torque converter 1 or other types of power transmission device. Specific examples applied to the torque converter 1 and the other types of power transmission device will be hereinafter explained with use of schematic diagrams.

Figure 13:
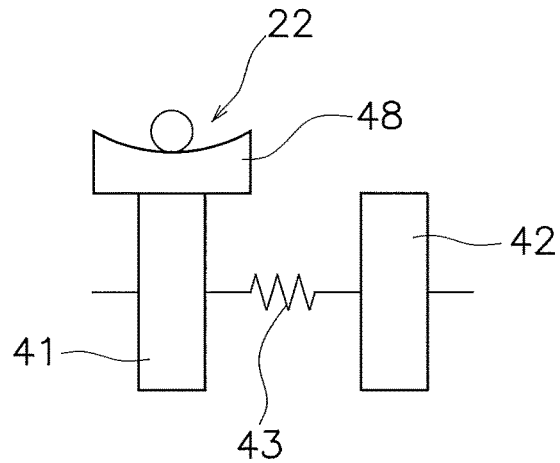
FIG. 13 is a schematic diagram showing application example 1 of the present invention.

(A) FIG. 13 is a diagram schematically showing a torque converter. The torque converter includes an input-side rotor 41, a hub flange 42 and a damper 43 disposed between the both members 41 and 42. The input-side rotor 41 includes members such as a front cover, a drive plate and a piston. The hub flange 42 includes a driven plate and a turbine hub. The damper 43 includes a plurality of torsion springs.

In the example shown in FIG. 13, a centrifugal element 48 is provided on any of rotary members composing the input-side rotor 41, and a cam mechanism 22 is provided to be actuated with use of a centrifugal force acting on the centrifugal element 48. A configuration applicable to the cam mechanism 22 is similar to that in the aforementioned respective preferred embodiments.

Figure 14:
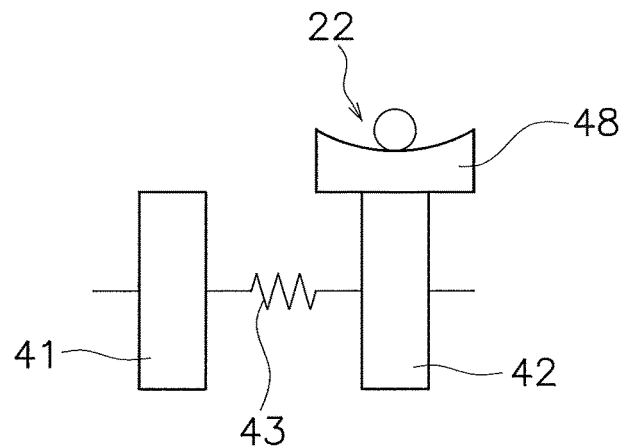
FIG. 14 is a schematic diagram showing application example 2 of the present invention.

(B) In a torque converter shown in FIG. 14, the centrifugal element 48 is provided on any of the rotary members composing the hub flange 42, and the cam mechanism 22 is provided to be actuated with use of a centrifugal force acting on the centrifugal element 48. A configuration applicable to the cam mechanism 22 is similar to that in the aforementioned respective preferred embodiments.

Figure 15:
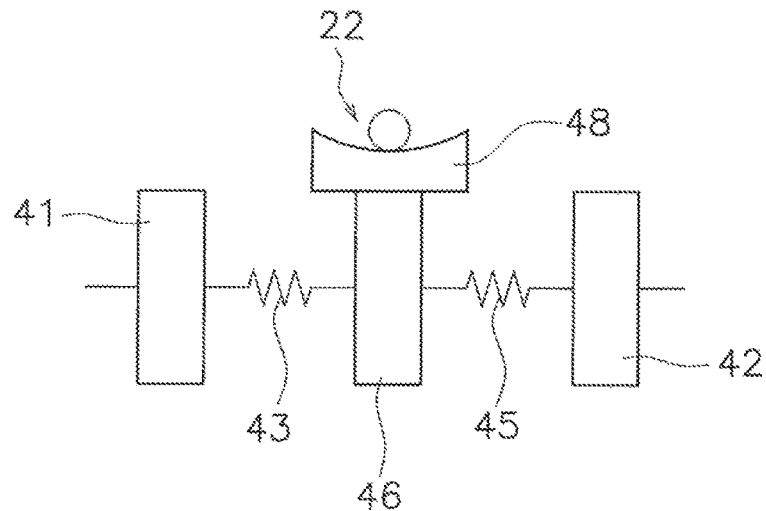
FIG. 15 is a schematic diagram showing application example 3 of the present invention.

(C) A torque converter shown in FIG. 15 includes another damper 45 and an intermediate member 46 provided between the two dampers 43 and 45 in addition to the configurations shown in FIGS. 13 and 14. The intermediate member 46 is rotatable relative to the input-side rotor 41 and the hub flange 42, and makes the two dampers 43 and 45 act in series.

In the example shown in FIG. 15, the intermediate member 46 is provided with the centrifugal element 48, and the cam mechanism 22 is provided to be actuated with use of a centrifugal force acting on the centrifugal element 48. A configuration applicable to the cam mechanism 22 is similar to that in the aforementioned respective preferred embodiments.

Figure 16:
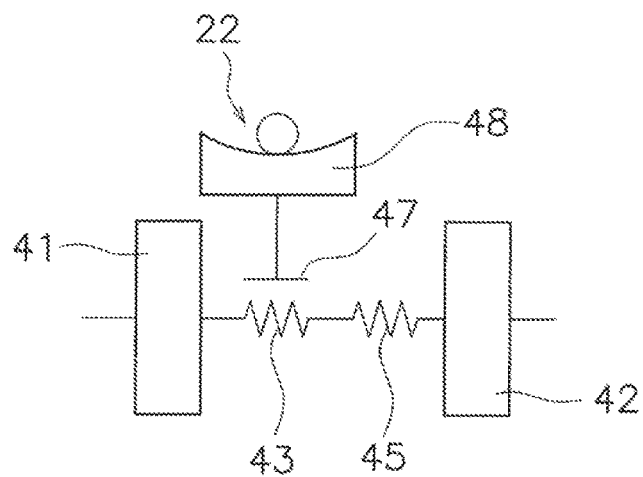
FIG. 16 is a schematic diagram showing application example 4 of the present invention.

(D) A torque converter shown in FIG. 16 includes a float member 47. The float member 47 is a member for supporting the torsion springs composing the damper 43. For example, the float member 47 has an annular shape and is disposed to cover the torsion springs from the outer peripheral side and at least one lateral side.

Additionally, the float member 47 is rotatable relative to the input-side rotor 41 and the hub flange 42, and is rotated together with the damper 43 by friction with the torsion springs of the damper 43. In other words, the float member 47 is also rotated.

In the example shown in FIG. 16, the float member 47 is provided with the centrifugal element 48. The cam mechanism 22 is provided to be actuated with use of a centrifugal force acting on the centrifugal element 48. A configuration applicable to the cam mechanism 22 is similar to that in the aforementioned respective preferred embodiments.

Figure 17:
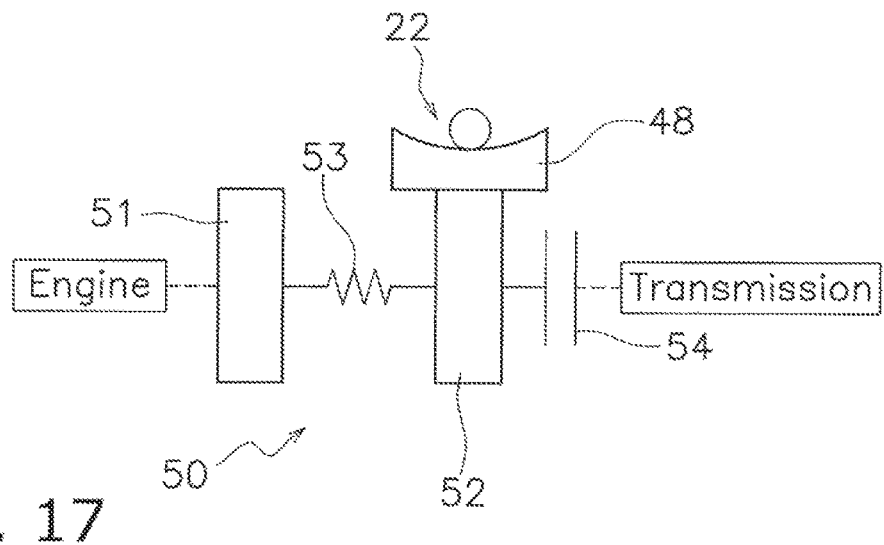
FIG. 17 is a schematic diagram showing application example 5 of the present invention.

(E) FIG. 17 is a schematic diagram of a power transmission device that includes a flywheel 50, composed of two inertia bodies 51 and 52, and a clutch device 54. In other words, the flywheel 50, disposed between the engine and the clutch device 54, includes the first inertia body 51, the second inertia body 52 and a damper 53. The second inertia body 52 is disposed to be rotatable relative to the first inertia body 51. The damper 53 is disposed between the two inertia bodies 51 and 52. It should be noted that the second inertia body 52 is composed of rotary members including a clutch cover composing the clutch device 54.

In the example shown in FIG. 17, the centrifugal element 48 is provided on any of the rotary members composing the second inertia body 52, and the cam mechanism 22 is provided to be actuated with use of a centrifugal force acting on the centrifugal element 48. A configuration applicable to the cam mechanism 22 is similar to that in the aforementioned respective preferred embodiments.

Figure 18:
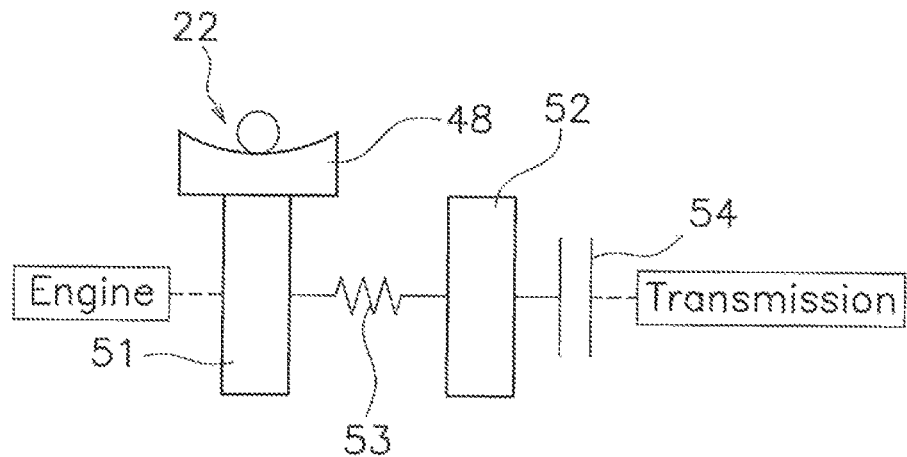
FIG. 18 is a schematic diagram showing application example 6 of the present invention.

(F) FIG. 18 shows an example of a power transmission device similar to that in FIG. 17. In this example, the centrifugal element 48 is provided on the first inertia body 51. Additionally, the cam mechanism 22 is provided to be actuated with use of a centrifugal force acting on the centrifugal element 48. A configuration applicable to the cam mechanism 22 is similar to that in the aforementioned respective preferred embodiments.

Figure 19:
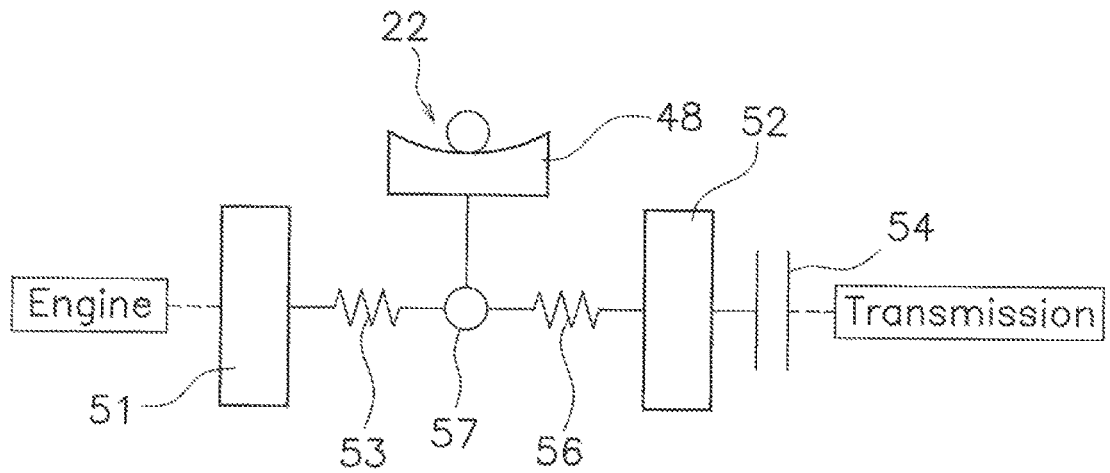
FIG. 19 is a schematic diagram showing application example 7 of the present invention.

(G) A power transmission device shown in FIG. 19 includes another damper 56 and an intermediate member 57 provided between the two dampers 53 and 56 in addition to the configurations shown in FIGS. 17 and 18. The intermediate member 57 is rotatable relative to the first and second inertia bodies 51 and 52.

In the example shown in FIG. 19, the intermediate member 57 is provided with the centrifugal element 48, and the cam mechanism 22 is provided to be actuated with use of a centrifugal force acting on the centrifugal element 48. A configuration applicable to the cam mechanism 22 is similar to that in the aforementioned respective preferred embodiments.

(H) The aforementioned application examples (E) to (G) have exemplified the configurations that the clutch device 54 is provided on the second inertia body 52. Instead of this, a third inertia body can be further connected elastically to the second inertia body 52, and the clutch device 54 can be provided between the third inertia body and the transmission.

Figure 20:
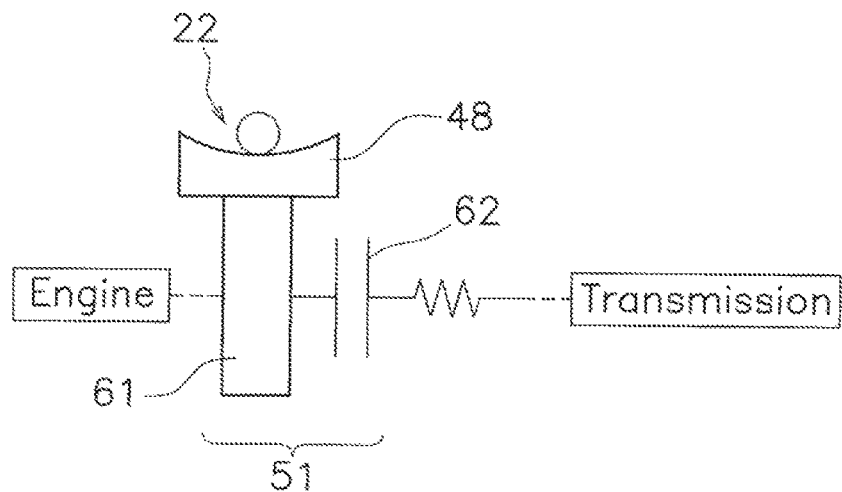
FIG. 20 is a schematic diagram showing application example 8 of the present invention.

(I) FIG. 20 is a schematic diagram of a power transmission device that a clutch device 62 is provided on a flywheel 61. In FIG. 20, the inertia body 51 is composed of the flywheel 61 and a clutch cover of the clutch device 62. In this example, the centrifugal element 48 is provided on any of the rotary members composing the inertia body 51, and the cam mechanism 22 is provided to be actuated with use of a centrifugal force acting on the centrifugal element 48. A configuration applicable to the cam mechanism 22 is similar to that in the aforementioned respective preferred embodiments.

Figure 21:
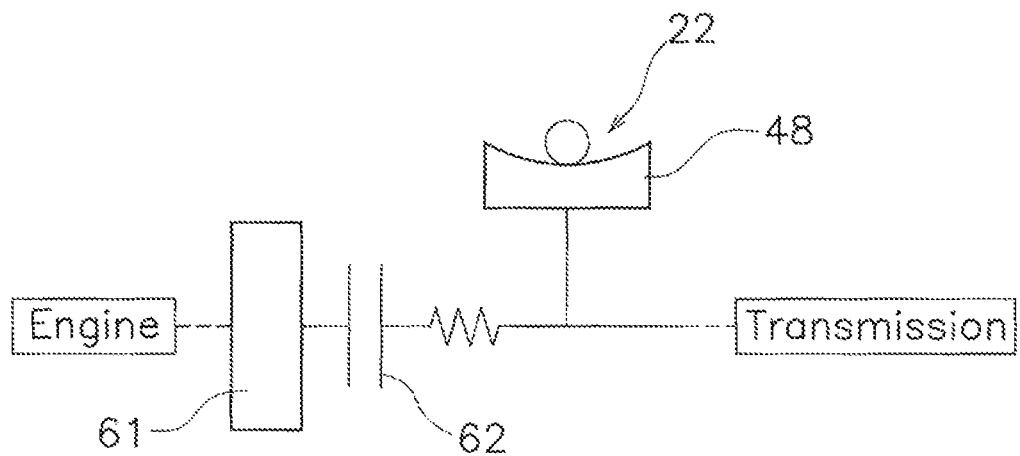
FIG. 21 is a schematic diagram showing application example 9 of the present invention.

(J) FIG. 21 shows an example of a power transmission device similar to that in FIG. 20. In this example, the centrifugal element 48 is provided on an output side of the clutch device 62. Additionally, the cam mechanism 22 is provided to be actuated with use of a centrifugal force acting on the centrifugal element 48. A configuration applicable to the cam mechanism 22 is similar to that in the aforementioned respective preferred embodiments.

What is claimed is:

1. A torque fluctuation inhibiting device configured to inhibit torque fluctuations, the torque fluctuation inhibiting device comprising:
    a first rotor;
    a second rotor disposed to be rotatable relative to the first rotor;
    a centrifugal element configured to receive a centrifugal force generated by rotation of the first rotor, the centrifugal element disposed to be movable with respect to the first rotor, the centrifugal element including an engaging portion configured to be engaged with the first rotor, the centrifugal element formed by a plurality of components, the centrifugal element disposed to be rotatable relative to the second rotor;
    a cam mechanism configured to generate a circumferential force in movement of the centrifugal element, the circumferential force reducing relative displacement between the first rotor and the second rotor, the cam mechanism formed by a cam follower portion and a cam portion, the cam follower portion provided on the second rotor, the cam portion provided on the centrifugal element, the cam portion engaged with the cam follower portion;
    wherein the plurality of components include a first component and a second component, the first component including the engaging portion, the second component provided separately from the first component, the second component including at least part of the cam portion; and
    wherein the second component is disposed between a pair of first components including the first component.

2. The torque fluctuation inhibiting device according to claim 1, wherein
    the cam portion is provided on the second component.

3. The torque fluctuation inhibiting device according to claim 1, wherein
    the cam portion is provided on the first component and the second component.

4. The torque fluctuation inhibiting device according to claim 1, wherein
    the engaging portion includes a first engaging portion and a second engaging portion, the second engaging portion disposed in opposition to the first engaging portion,
    the first engaging portion is provided on one of a pair of first components including the first component, and
    the second engaging portion is provided on the other of the pair of first components.

5. The torque fluctuation inhibiting device according to claim 1, wherein
    the engaging portion includes a first engaging portion and a second engaging portion, the second engaging portion disposed in opposition to the first engaging portion, and
    the first engaging portion and the second engaging portion are provided on a pair of first components including the first component on a one-to-one basis.

6. A torque fluctuation inhibiting device configured to inhibit torque fluctuations, the torque fluctuation inhibiting device comprising:
    a first rotor;
    a second rotor disposed to be rotatable relative to the first rotor;
    a centrifugal element configured to receive a centrifugal force generated by rotation of the first rotor, the centrifugal element disposed to be movable with respect to the first rotor, the centrifugal element including an engaging portion configured to be engaged with the first rotor, the centrifugal element formed by a plurality of components, the centrifugal element disposed to be rotatable relative to the second rotor; and
    a cam mechanism configured to generate a circumferential force in movement of the centrifugal element, the circumferential force reducing relative displacement between the first rotor and the second rotor, the cam mechanism formed by a cam follower portion and a cam portion, the cam follower portion provided on the second rotor, the cam portion provided on the centrifugal element, the cam portion engaged with the cam follower portion;
    wherein the plurality of components include a third component and a fourth component, the fourth component provided separately from the third component, each of the third component and the fourth component includes the engaging portion, and one of the third component and the fourth component includes the cam portion.

7. The torque fluctuation inhibiting device according to claim 6, wherein the cam portion is integrated with the one of the third and fourth components.

8. The torque fluctuation inhibiting device according to claim 6, wherein
the engaging portion includes a third engaging portion and a fourth engaging portion, the fourth engaging portion disposed in opposition to the third engaging portion,
the third engaging portion is provided on one of the third and fourth components, and
the fourth engaging portion is provided on the other of the third and fourth components.

9. A torque converter disposed between an engine and a transmission, the torque converter comprising:
an input-side rotor to which a torque is inputted from the engine;
an output-side rotor configured to output the torque to the transmission;
a damper disposed between the input-side rotor and the output-side rotor; and
a torque fluctuation inhibiting device, including
a centrifugal element configured to receive a centrifugal force generated by rotation of the input-side rotor, the centrifugal element disposed to be movable with respect to the input-side rotor, the centrifugal element including an engaging portion configured to be engaged with the input-side rotor, the centrifugal element formed by a plurality of components, and
a cam mechanism configured to generate a circumferential force in movement of the centrifugal element, the circumferential force reducing relative displacement between the input-side rotor and the output-side rotor.

10. A power transmission device comprising:
a flywheel including a first inertia body, a second inertia body and a damper, the first inertia body rotated about a rotational axis, the second inertia body rotated about the rotational axis, the second inertia body rotatable relative to the first inertia body, the damper disposed between the first inertia body and the second inertia body;
a clutch device provided between the second inertia body of the flywheel and a transmission; and
a torque fluctuation inhibiting device, including
a centrifugal element configured to receive a centrifugal force generated by rotation of the first inertia body, the centrifugal element disposed to be movable with respect to the first inertia body, the centrifugal element including an engaging portion configured to be engaged with the first inertia body, the centrifugal element formed by a plurality of components, and
a cam mechanism configured to generate a circumferential force in movement of the centrifugal element, the circumferential force reducing relative displacement between the first inertia body and the second inertia body.

* * * * *